(12) United States Patent
Lin et al.

(10) Patent No.: US 10,071,915 B2
(45) Date of Patent: Sep. 11, 2018

(54) FILTER DEVICE COMPRISING GEAR DRIVING ASSEMBLY

(71) Applicants: Kemflo (Nanjing) Environmental Technology Co., Ltd., Nanjing (CN); Kemflo International Co., Ltd., Pingtung (TW); Chingshiung Lin, Pingtung (TW)

(72) Inventors: Jack Lin, Nanjing (CN); Hai peng Zhou, Nanjing (CN); Hui zhou Lin, Nanjing (CN)

(73) Assignees: Kemflo (Nanjing) Environmental Technology Co., Ltd. (CN); Ching Hsiung Lin (TW)

( * ) Notice: Subject to any disclaimer, the term of this patent is extended or adjusted under 35 U.S.C. 154(b) by 438 days.

(21) Appl. No.: 14/853,139

(22) Filed: Sep. 14, 2015

(65) Prior Publication Data

US 2016/0263504 A1 Sep. 15, 2016

(30) Foreign Application Priority Data

Mar. 12, 2015 (CN) ...................... 2015 2 0141610 U

(51) Int. Cl.
*B01D 27/08* (2006.01)
*C02F 1/00* (2006.01)

(52) U.S. Cl.
CPC ........ *C02F 1/003* (2013.01); *C02F 2201/004* (2013.01); *C02F 2201/006* (2013.01)

(58) Field of Classification Search
CPC .. B01D 27/08; B01D 35/30; B01D 2201/301; B01D 2201/305; B01D 2201/307; B01D 2221/02; B65F 1/08; B65F 2210/148; C02F 1/003; C02F 2201/004; C02F 2201/006; F16J 13/08; F16J 13/12; F16J 13/14; F16J 13/16; F16J 13/18; Y10T 74/19502; Y10T 74/19512; Y10T 74/19819
See application file for complete search history.

(56) References Cited

U.S. PATENT DOCUMENTS

2016/0213191 A1* 7/2016 Hale ................... A47J 31/3676

\* cited by examiner

*Primary Examiner* — Patrick J Orme
(74) *Attorney, Agent, or Firm* — Emerson, Thomas & Bennett, LLC; Roger D. Emerson

(57) ABSTRACT

The present invention provides a filter device having a water inlet and a water outlet. The filter device comprises a filter cabin (10) and a filter core (11). The water inlet and the water outlet are disposed on one end of the filter cabin (10). The filter cabin (10) comprises a cabin body, a cabin door and a gear driving assembly. The cabin body disposes a gear-mounting slot for receiving and holding the gear driving assembly. The filter core has an end portion, which is fluidly connected with the water inlet and the water outlet. The filter core disposes a driving rack on an outside surface thereof. The driving rack is engaged with the gear driving assembly. The filter device of the present invention can quickly replace the filter core (11) by the special design of the filter core, the filter cabin (10) and the gear driving assembly.

7 Claims, 14 Drawing Sheets

FILTER DEVICE COMPRISING GEAR DRIVING ASSEMBLY

BACKGROUND OF THE INVENTION

1. Field of the Invention

The present invention relates to a filter device, and more particularly to a filter device for easily replacing a filter core.

2. Description of the Prior Art

With the improvement of people's life standards, the people pay more and more attention to the safety of the drinking water. In order to cater to the consumer demand for the high quality drinking water, there are a lot of household electrical appliances such as refrigerators, drinking fountains, coffee machines and so on, and a water filtration system is added into these household electrical appliances. But because each household appliance structure is different and the added water filtration system is relatively complex, users are often confused in the replacement operation of the filter core of the water filtration system. Users do not know how to operate such systems which leads to the operation being time-consuming, laborious and other issues. The delay of the replace operation of the filter core will cause serious two times pollution of the drinking water, so that the current household electrical appliances having the water filter system have not the actual use value.

Hence, we need a new, compact, portable filter device, which can be applied to a variety of home appliances and can make the user be easily and quickly replace the filter device.

BRIEF SUMMARY OF THE INVENTION

Accordingly, an object of the present invention is to provide a filter device, a filter core of which can be conveniently fixed in and be directly and easily extracted out of a cabin body, and the replace operation of the filter core is greatly simplified.

To achieve the above object, in accordance with the present invention, a filter device is provided. The filter device has a water inlet and a water outlet, and comprises a filter cabin and a filter core. The filter cabin comprises a cabin body for accommodating the filter core, a cabin door being rotatably connected to the cabin body, and a gear driving assembly being mounted on a connection position of the cabin body and the cabin door. The cabin body disposes a gear-mounting slot for receiving and holding the gear driving assembly. The water inlet and the water outlet are disposed on one end of the filter cabin. The filter core has an end portion, which is fluidly connected with the water inlet and the water outlet. The filter core disposes a driving rack on an outside surface thereof. Wherein the driving rack is engaged with the gear driving assembly.

In one embodiment of the present invention, the gear driving assembly includes a driving gear and a sub rail wheel, both of which are axially connected together by a fastener. The driving gear disposes a slider track groove, at least two wheel-limiting bars located in the slider track groove, and gaps defined by the two wheel-limiting bars and the slider track groove; each wheel-limiting bar disposes a gear track protrusion. The sub rail wheel disposes two wheel track projections and a torsion spring-fastening boss on one side thereof connected with the driving gear, and further disposes a wheel-fastening pin on the other side thereof. The two wheel track projections are inserted into the gaps for making the driving gear and the sub rail wheel to be combined together.

In one embodiment of the present invention, the gear driving assembly includes a slider and a torsion spring. The slider is placed in the slider track groove for pushing the gear track protrusion to drive the driving gear to rotate relative to the sub rail wheel. The torsion spring is mounted on the torsion spring-fastening boss.

In one embodiment of the present invention, the wheel track projection has an arc cross section, an arc center angle of which is between 180 degrees and 270 degrees; and the wheel track projection has a lowest position and a highest position, which are continuously connected. When the driving gear and the sub rail wheel are combined together, the lowest position of the wheel track projection is aligned with the wheel-limiting bar of the driving gear, and the highest position of the wheel track projection is aligned with the gear track protrusion.

In one embodiment of the present invention, the cabin door disposes a slider-fastening portion, which forms a slider-receiving groove thereon; and the slider is embedded into the slider-receiving groove.

In one embodiment of the present invention, the cabin door further disposes a slider spring in the slider-receiving groove, and the slider spring is located between the slider and the bottom of the slider-receiving groove.

In one embodiment of the present invention, the cabin body disposes a core-guiding groove on the bottom of the cabin body, and correspondingly the filter core disposes a convex rib on the outside surface thereof for being engaged with the core-guiding groove.

In one embodiment of the present invention, the filter core further disposes a protrusion block on the end portion thereof.

In one embodiment of the present invention, the cabin body further disposes a door-limiting post on the connection position of the cabin door and the cabin body, and the door-limiting post is used to limit an opening angle of the cabin door.

In one embodiment of the present invention, the cabin body further disposes a door spring to be mounted on the connection position of the cabin door and the cabin body.

In one embodiment of the present invention, the filter device further comprises a door button, which is connected with the cabin body through a button-fastening shaft; the button-fastening shaft disposes a spring thereon; and the cabin door are locked by the cabin button.

In one embodiment of the present invention, the cabin door disposes a locking portion for being engaged with the cabin button.

In the present invention, the filter device of the present invention can realize the object of quickly replacing the filter core by the special design of the filter core, the filter cabin and the gear driving assembly. The user can pull out the filter core from the filter cabin by opening the cabin door.

Comparing with the prior art, the filter device of the present invention can make the user save energy, fast and quickly replace the filter core by the special design of the filter core, the filter cabin and the gear driving assembly. The filter device can be applied in the most of home appliances, thereby largely improving the use value thereof, and greatly satisfying the consumer demand for the high quality drinking water.

DETAILED DESCRIPTION OF THE PREFERRED EMBODIMENTS

Figure 1:
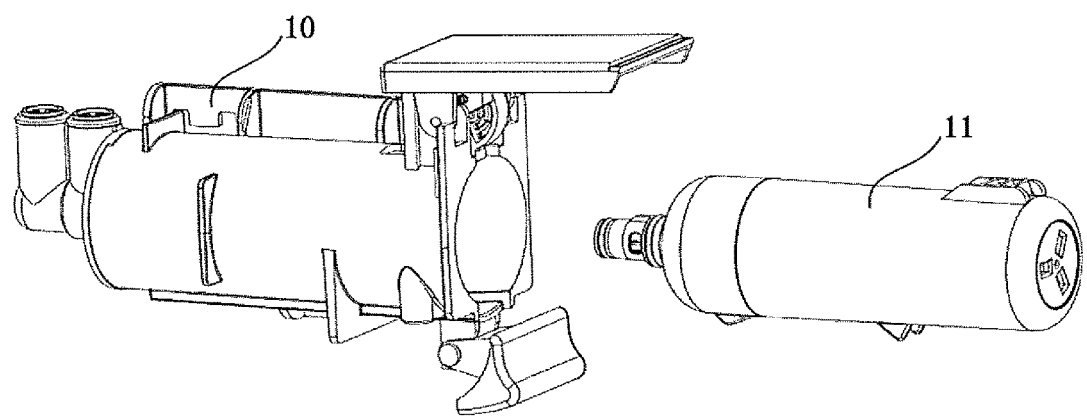
FIG. 1 is a perspective view of a filter device of the present invention.

The following description of every embodiment with reference to the accompanying drawings is used to exemplify a specific embodiment, which may be carried out in the present invention. The embodiment is intended to illustrate, but not to limit, the present invention. In the drawings, the components having similar structures are denoted by the same numerals.

Please refer to FIG. 1, FIG. 1 is a perspective view of a filter device of the present invention. The filter device comprises a filter cabin 10 and a filter core 11.

According to FIGS. 2 to 5, the filter cabin 10 will be described in the following text.

Figure 2:
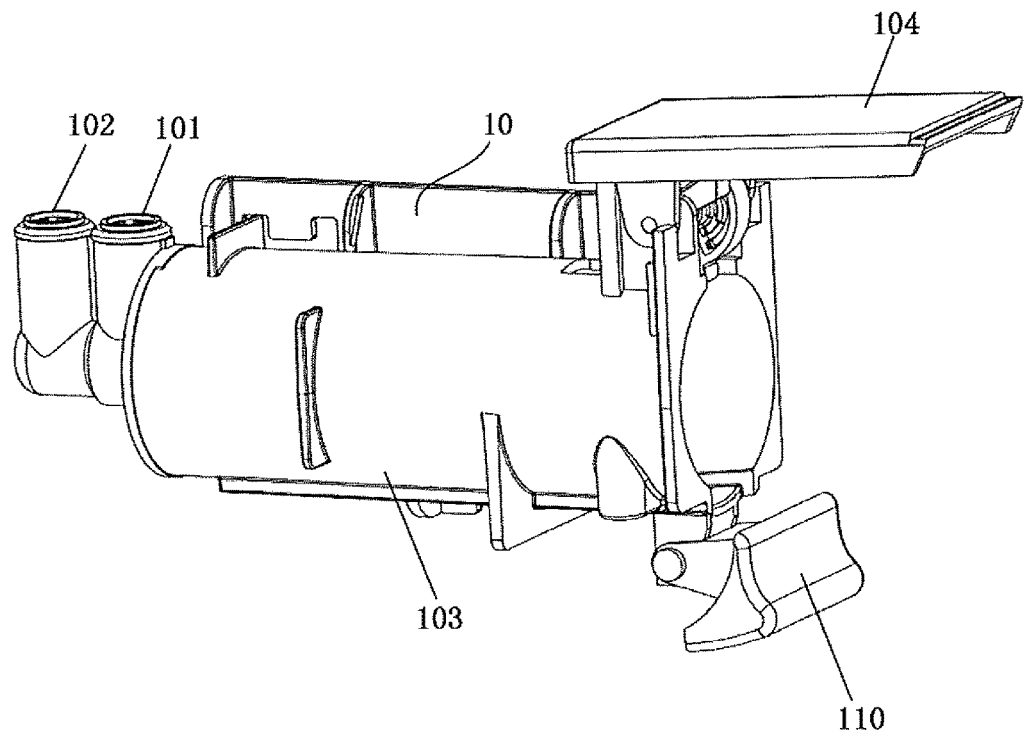
FIG. 2 is a perspective view of a filter cabin of the filter device.

Please refer to FIG. 2, FIG. 2 is a perspective view of a filter cabin 10 of the filter device. The filter cabin 10 disposes a water inlet 101 and a water outlet 102 on one end thereof. The filter cabin 10 includes a cabin body 103 and a cabin door 104. The cabin door 104 is rotatably connected to the cabin body 103. The filter cabin 10 further includes a cabin button 110.

Figure 3:
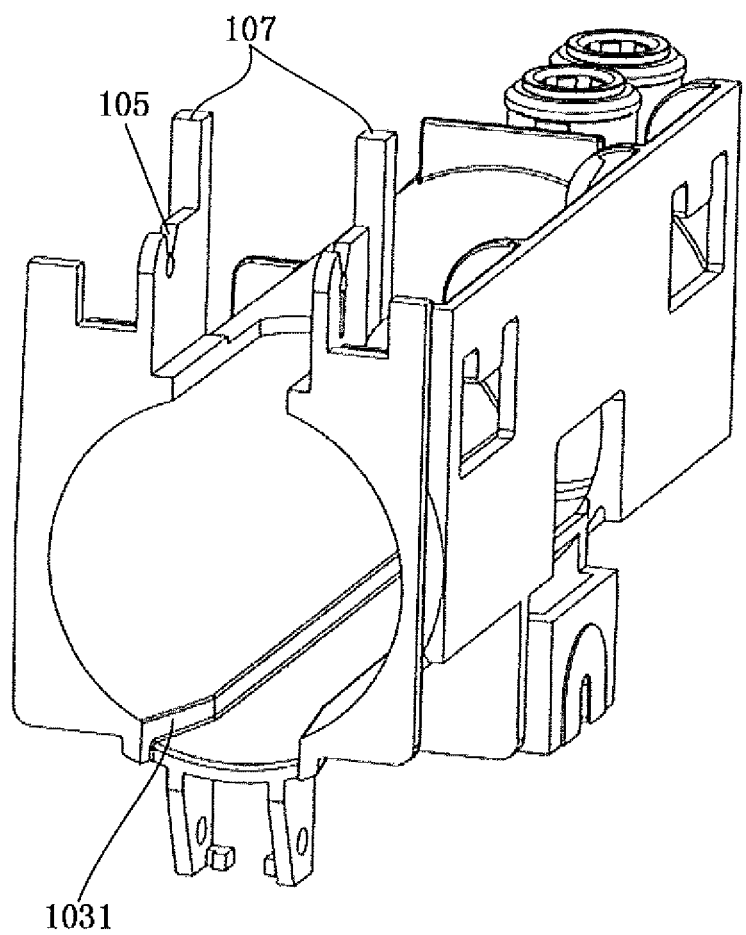
FIG. 3 is a perspective view of a cabin body of the filter cabin.
Figure 4:
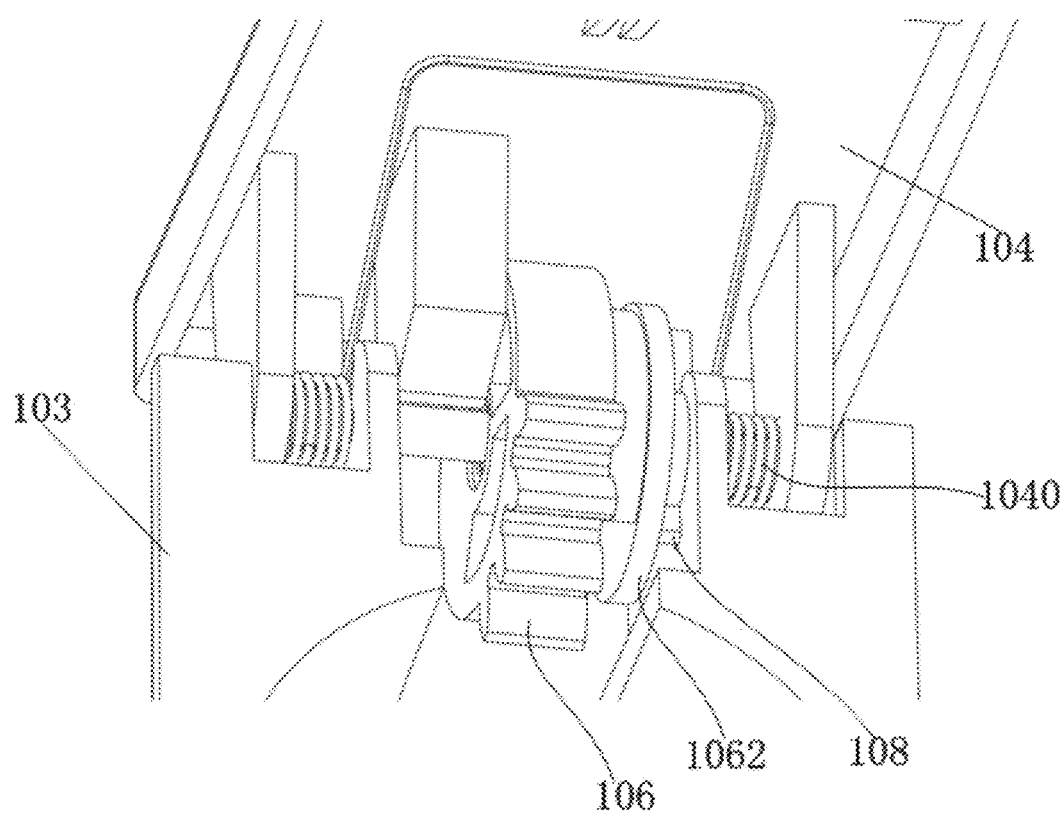
FIG. 4 is a partial enlarged view of a connection position of the cabin body and a cabin door.

Please refer to FIGS. 3 and 4, FIG. 3 is a perspective view of the cabin body 103, and FIG. 4 is a partial enlarged view of a connection position of the cabin body 103 and a cabin door 104.

Please refer to FIGS. 3 and 4, the cabin body 103 disposes a gear-mounting slot 105 on a connection position of the cabin body 103 and a cabin door 104. A gear driving assembly 106 is mounted on the connection position and fixed in the gear-mounting slot 105. The cabin body 103 further disposes a door-limiting post 107 on the connection position to limit an opening angle of the cabin door 104. Further, the filter cabin 10 further includes a door spring 1040 to be mounted on the connection position. The door spring 1040 ensures that the cabin door 104 can be automatically opened to a certain angle under the force of the door spring 1040, and ensures that the cabin door 104 can be maintained at a maximum opening position under the opening state.

As shown in FIG. 3, the cabin body 103 disposes a core-guiding groove 1031 on the bottom of the cabin body 103. The core-guiding groove 1031 can make the filter core 11 be quickly and actually inserted into the cabin body 103.

Figure 5:
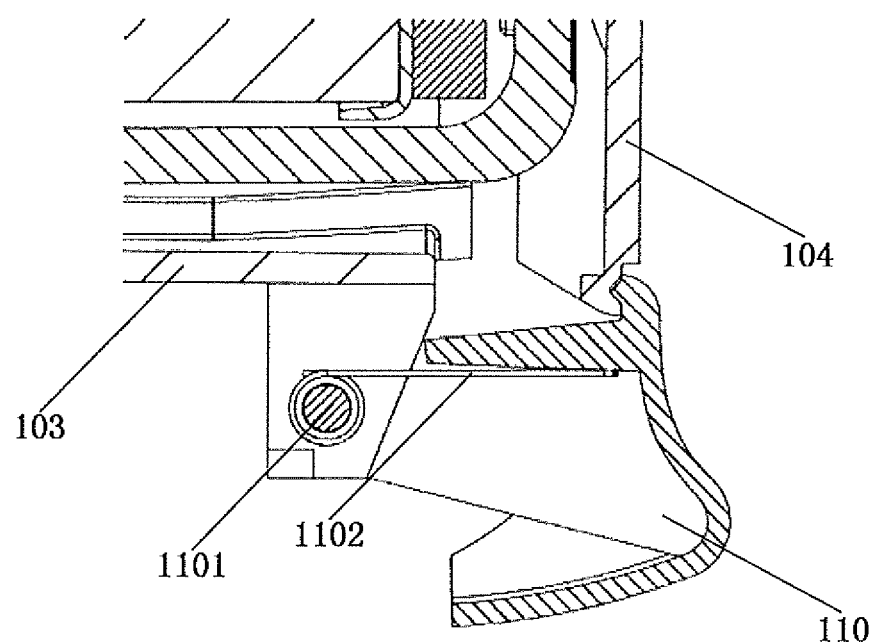
FIG. 5 is a sectional view showing the cabin body and a cabin button.

Please continue to refer to FIG. 5, FIG. 5 is a sectional view showing the cabin body 103 and the cabin button 110. The cabin button 110 is connected with the cabin body 103 through a button-fastening shaft 1101. The button-fastening shaft 1101 disposes a spring 1102 thereon, and the cabin door 104 are locked by the cabin button 110.

The following text will describe the gear driving assembly 106 in detail according to FIGS. 6 to 10D.

Figure 6:
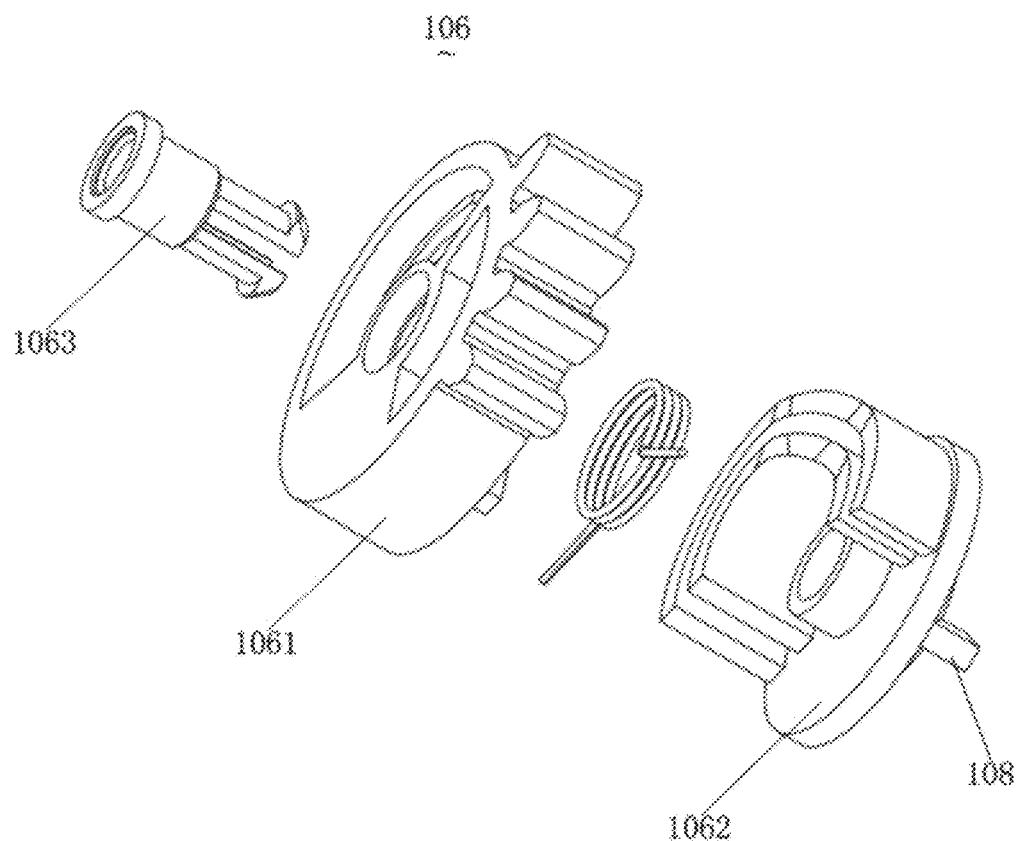
FIG. 6 is an exploded view of a gear driving assembly.

Please refer to FIG. 6, FIG. 6 is an exploded view of the gear driving assembly 106. The gear driving assembly 106 includes a driving gear 1061 and a sub rail wheel 1062. The driving gear 1061 and a sub rail wheel 1062 are axially connected together by a fastener 1063.

Figure 7:
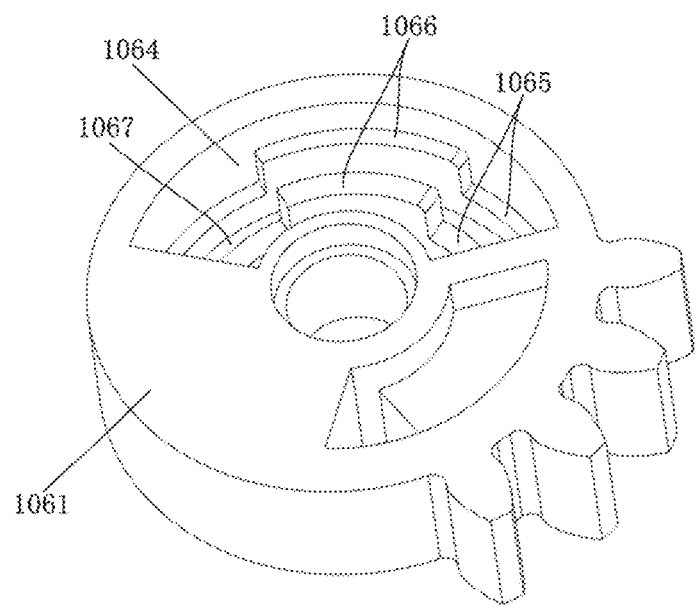
FIG. 7 is a perspective view of a driving gear of the gear driving assembly.

Please refer to FIG. 7, FIG. 7 is a perspective view of the driving gear 1061, which disposes a slider track groove 1064 and two wheel-limiting bars 1065 thereon. The two wheel-limiting bars 1065 are located in the slider track groove 1064. There further forms gaps 1067 defined by the two wheel-limiting bars 1065 and the groove 1064. Each wheel-limiting bar 1065 disposes a gear track protrusion 1066.

Figure 8:
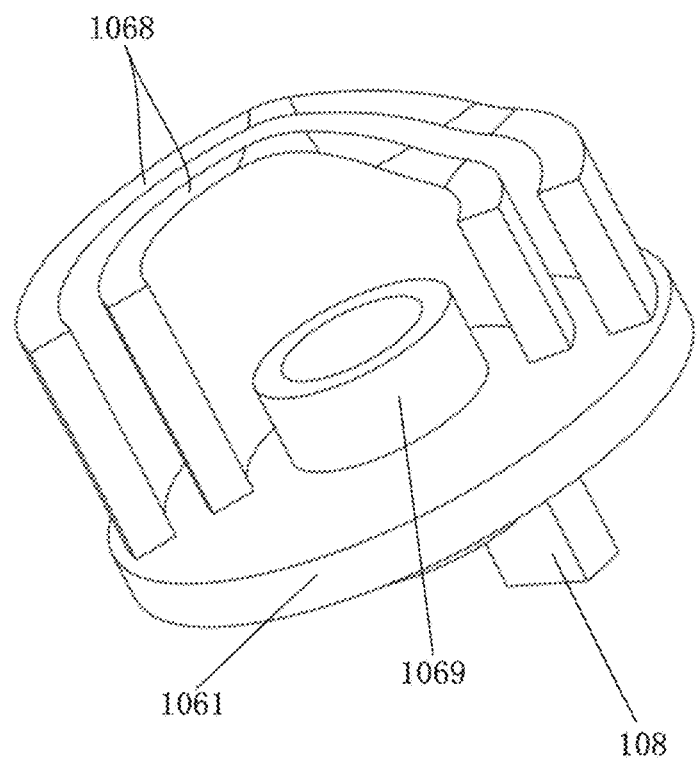
FIG. 8 is a perspective view of a sub rail wheel of the gear driving assembly.

Please refer to FIG. 8, FIG. 8 is a perspective view of the sub rail wheel 1062. The sub rail wheel 1062 disposes two wheel track projections 1068 and a torsion spring-fastening boss 1069 on one side thereof connected with the driving gear 1061. The sub rail wheel 1062 further disposes a wheel-fastening pin 108 on the other side thereof. The wheel-fastening pin 108 is used to fix the sub rail wheel 1062 onto the filter cabin 10. A torsion spring is mounted on the torsion spring-fastening boss 1069. The two wheel track projections 1068 can be inserted into the gaps 1067 (the numeral seen in FIG. 7).

Figure 9:
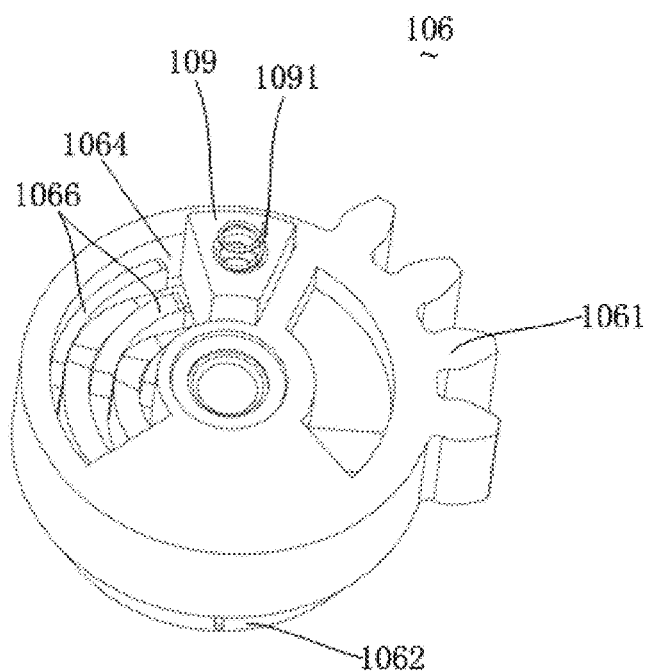
FIG. 9 is a perspective view of the gear driving assembly.
Figure 10A:
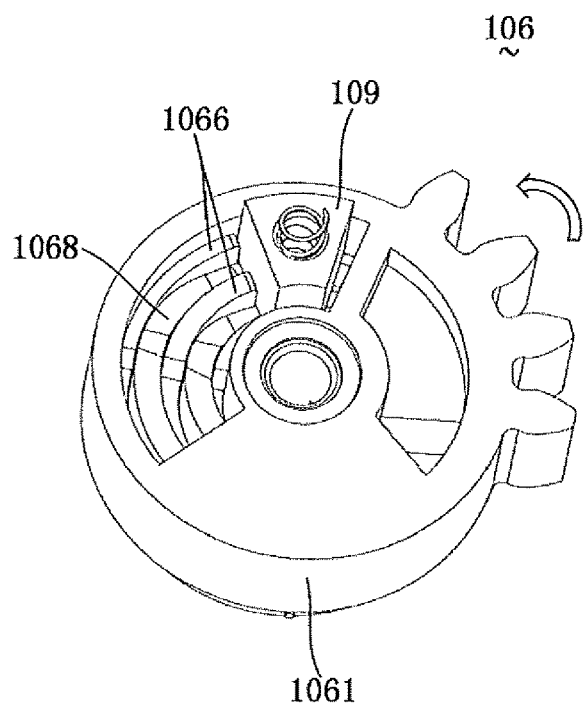
FIGS. 10A to 10D are schematic views showing the operation principle of the gear driving assembly.
Figure 10B:
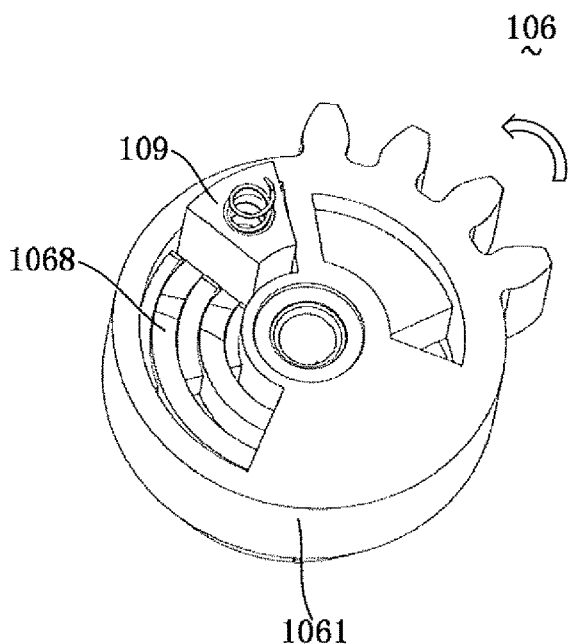
Figure 10C:
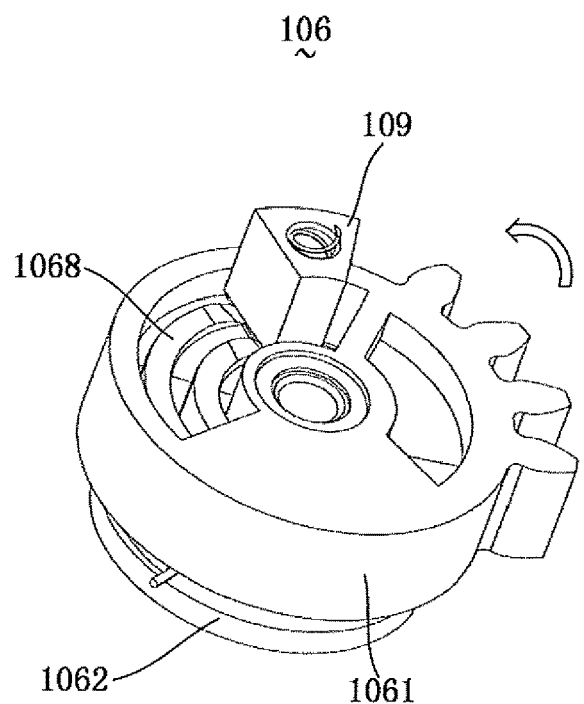
Figure 10D:
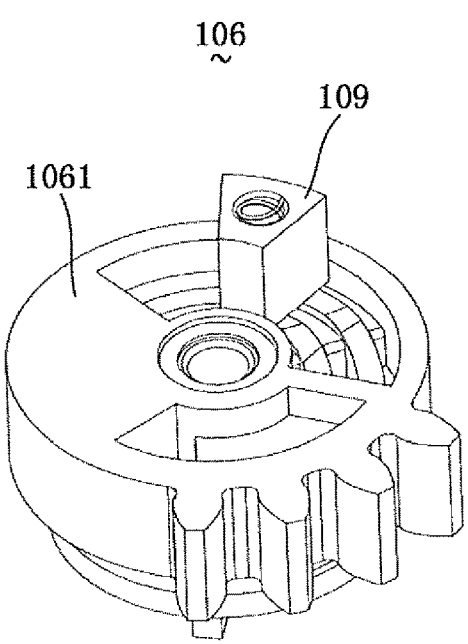

Please refer to FIG. 9, FIG. 9 is a perspective view of the gear driving assembly 106. The gear driving assembly 106 further includes a slider 109, which is placed in the slider track groove 1064 of the driving gear 1061. Please refer to FIGS. 7, 8 and 9, the cross section of the wheel track projection 1068 of the sub rail wheel 1062 is an arc, the arc center angle of which is between 180 degrees and 270 degrees. The wheel track projection 1068 has a lowest position and a highest position, which are continuously connected. When the driving gear 1061 and the sub rail wheel 1062 are combined together, the lowest position of the wheel track projection 1068 is aligned with the wheel-limiting bar 1065 of the driving gear 1061, and the highest position of the wheel track projection 1068 is aligned with the gear track protrusion 1066.

Please refer to FIGS. 10A to 10D, which are schematic views showing the operation principle of the gear driving assembly 106. In an initial position, the slider 109 is placed in the slider track groove 1064 (the numeral seen in FIG. 7). When the slider 109 slide, the slider 109 can apply a rotation force unto the gear track protrusion 1066, and the gear track protrusion 1066 simultaneously pushes the driving gear 1061 to rotate relative to the sub rail wheel 1062. Because the lowest and highest positions of the wheel track projection 1068 are continuously connected, the slider 109 can smoothly slide from the lowest position toward the highest position. When the slider 109 slides at the gear track protrusion 1066, the slider 109 can continue sliding along the slider track groove 1064 because the highest position of the wheel track projection 1068 is aligned with the gear track protrusion 1066.

Figure 11A:
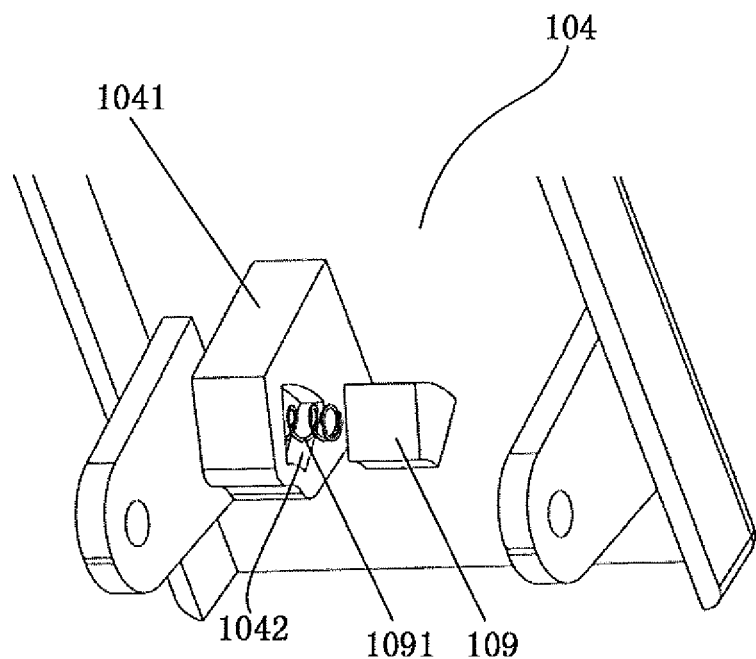
FIGS. 11A and 11B are partial perspective views of the cabin door.
Figure 11B:
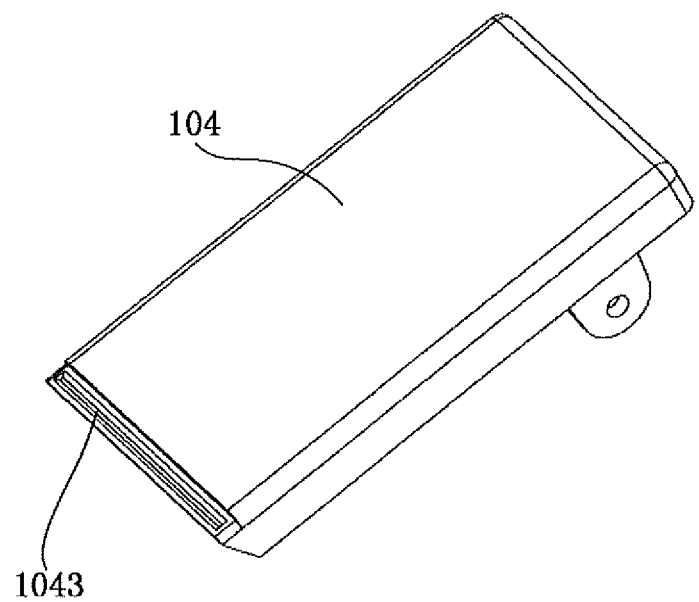

The following text will describe the cabin door 104 in detail according to FIGS. 11A and 11B.

Please refer to FIGS. 11A and 11B, which are partial perspective views of the cabin door 104. As shown in FIG. 11A, the cabin door 104 disposes a slider-fastening portion 1041, which forms a slider-receiving groove 1042 thereon. The slider 109 can be embedded into the slider-receiving groove 1042. A slider spring 1091 is positioned between the slider 109 and the bottom of the slider-receiving groove 1042. Preferably, as shown in FIG. 11B, the cabin door 104 further disposes a locking portion 1043, which can be engaged with the cabin button 110 for locking the cabin door 104.

A detailed description of the filter core 11 will be given in below text according to FIG. 12.

Figure 12:
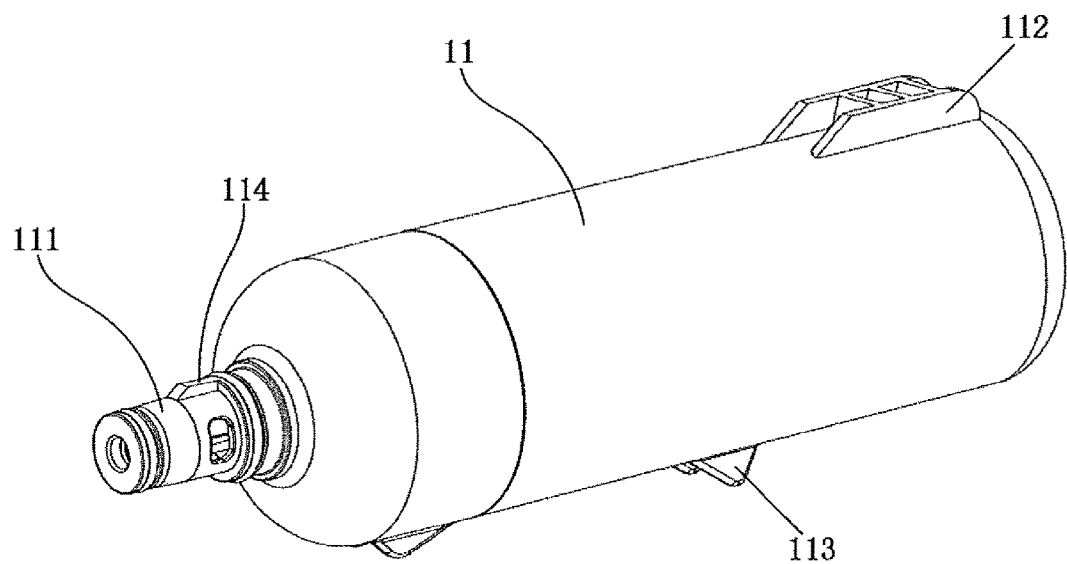
FIG. 12 is a perspective view of a filter core.
Figure 13A:
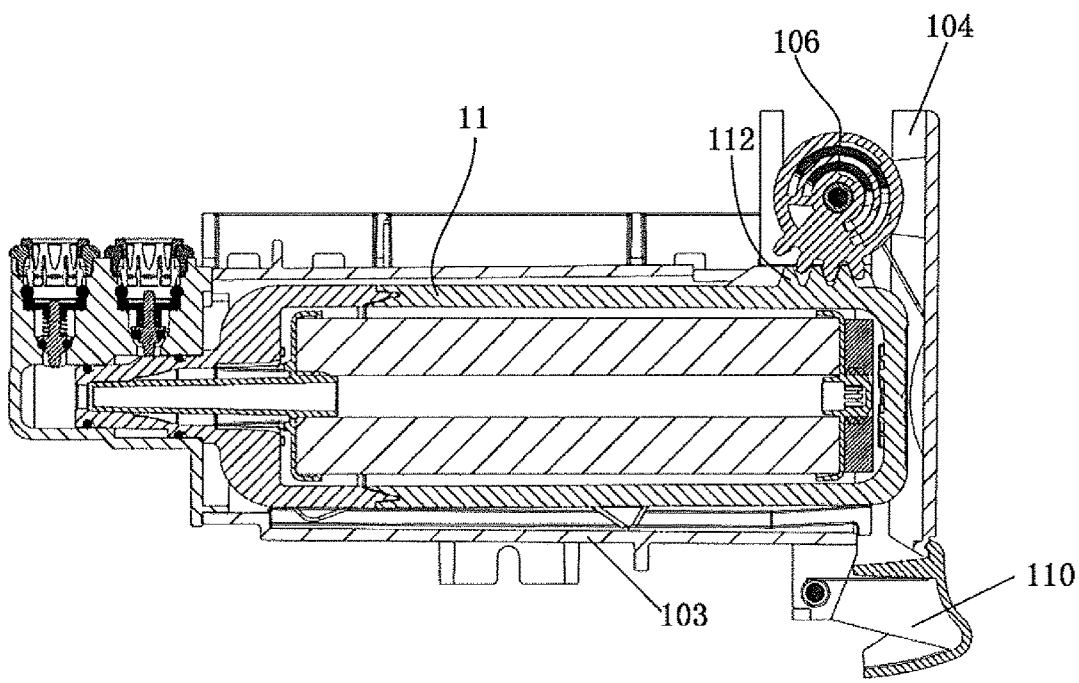
FIGS. 13A to 13D are schematic views showing the process of removing the filter core.
Figure 13B:
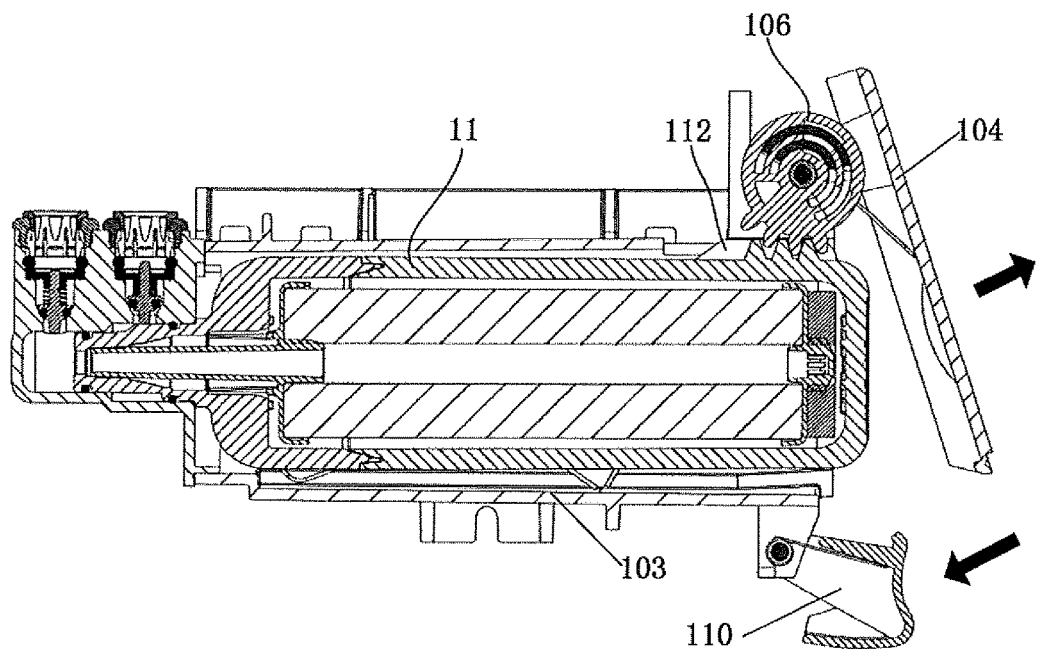
Figure 13C:
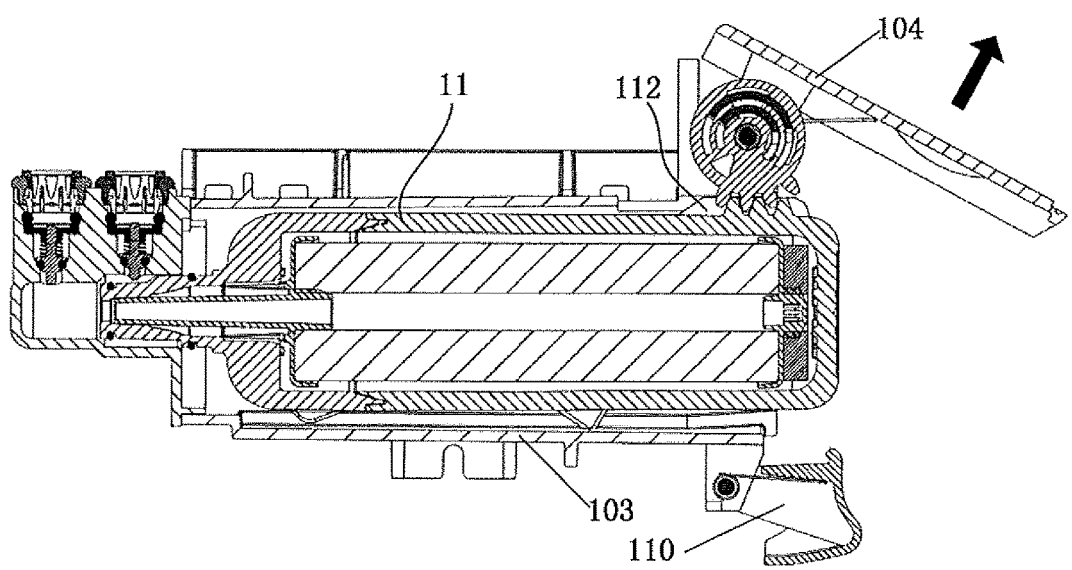

Please refer to FIG. 12, FIG. 12 is a perspective view of the filter core 11. The filter core 11 has an end portion 111, which can be fluidly connected with the water inlet 101 and the water outlet 102 (the numerals 101 and 102 seen in FIG. 2). The filter core 11 disposes a driving rack 112 on a top outside surface thereof. The driving rack 112 is used to be engaged with the gear driving assembly 106 (the numeral seen in FIG. 13A). The filter core 11 further disposes a convex rib 113 on a bottom outside surface thereof. The convex rib 113 is used to be engaged with the core-guiding groove 1031. The filter core 11 further disposes a protrusion block 114 on the end portion 111 to be used to control a cut-off valve located in the water inlet 101 and the water outlet 102, thereby realizing a fluid connection between the water inlet 101 and the water outlet 102.

Figure 13D:
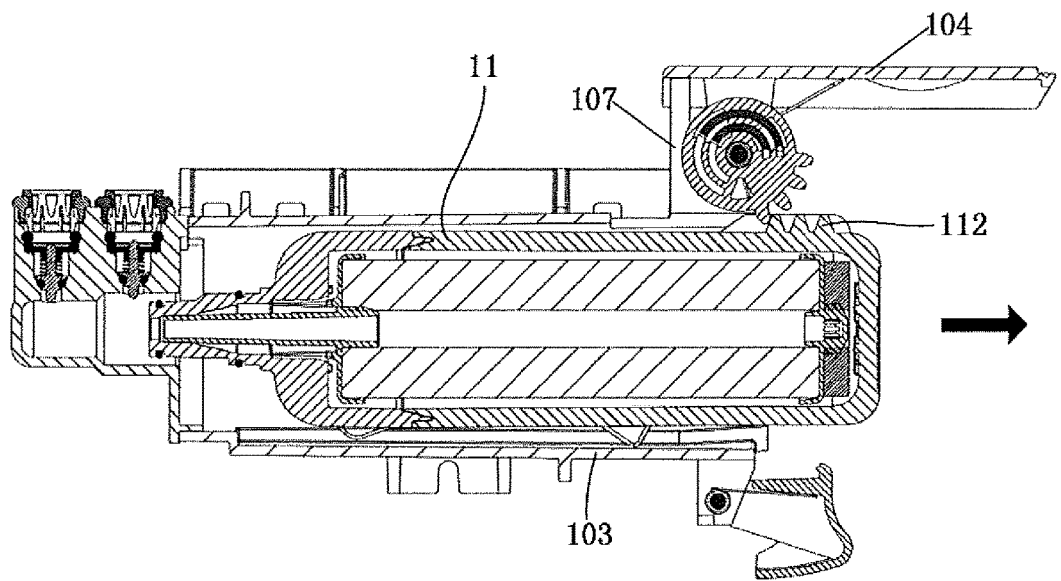

In use, the user can refer to FIGS. 13A to 13D, which are schematic views showing the process of removing the filter core 11. As shown in FIGS. 13A to 13D, when the filter core 11 is in an installed state, the cabin button 110 is engaged with the cabin door 104 for locking it, and the gear driving assembly 106 is engaged with the driving rack 112 under the push force of the cabin door 104. The cabin door 104 and the driving rack 112 can together lock the filter core 11, so the filter core 11 can avoid to be pushed out or be ejected from the cabin body 103 under the water pressure. When pressing the cabin button 110, the cabin door 104 will be automatically opened under the force of the door spring 1040 (the numeral seen in FIG. 4). When opening the cabin door 104, the cabin door 104 can apply a force onto the gear driving assembly 106 by the slider 109 (the numeral seen in FIG. 11A), and the gear driving assembly 106 will drive the driving rack 112 to move and further pull out the filter core 11 from the cabin body 103. When the cabin door 104 is fully opened, as shown in FIG. 13D, the cabin door 104 contacts with the door-limiting post 107, the filter core 11 completely leaves a seal section of the cabin body 103. The seal section of the cabin body 103 has a large resistance. When filter core 11 completely leaves the seal section, the user can easily and directly pull out the filter core 11 from the cabin body 103.

Figure 14A:
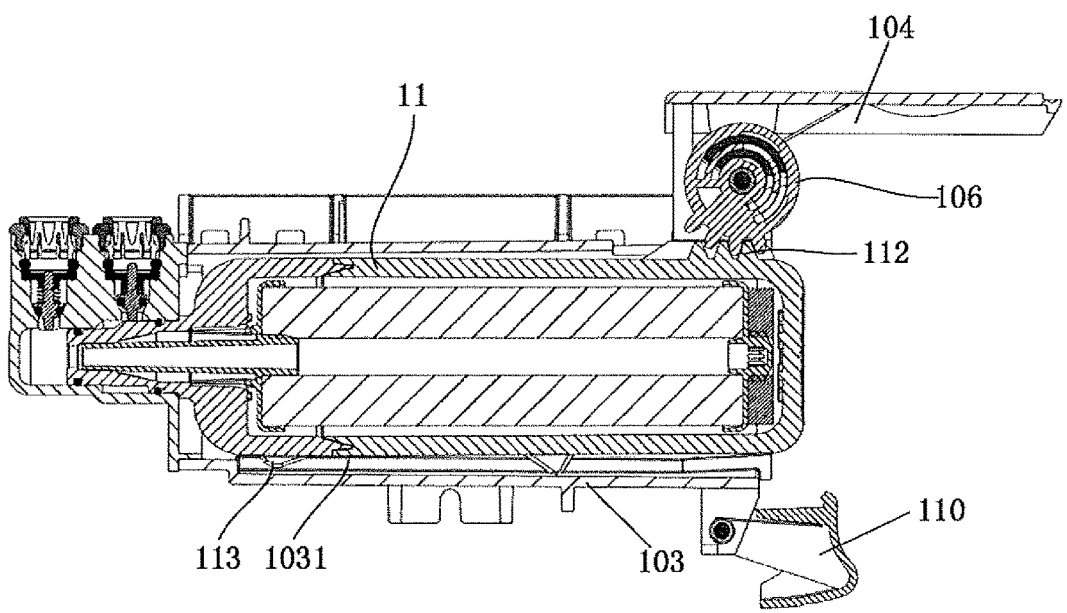
FIGS. 14A to 14D are schematic views showing the process of inserting the filter core.
Figure 14B:
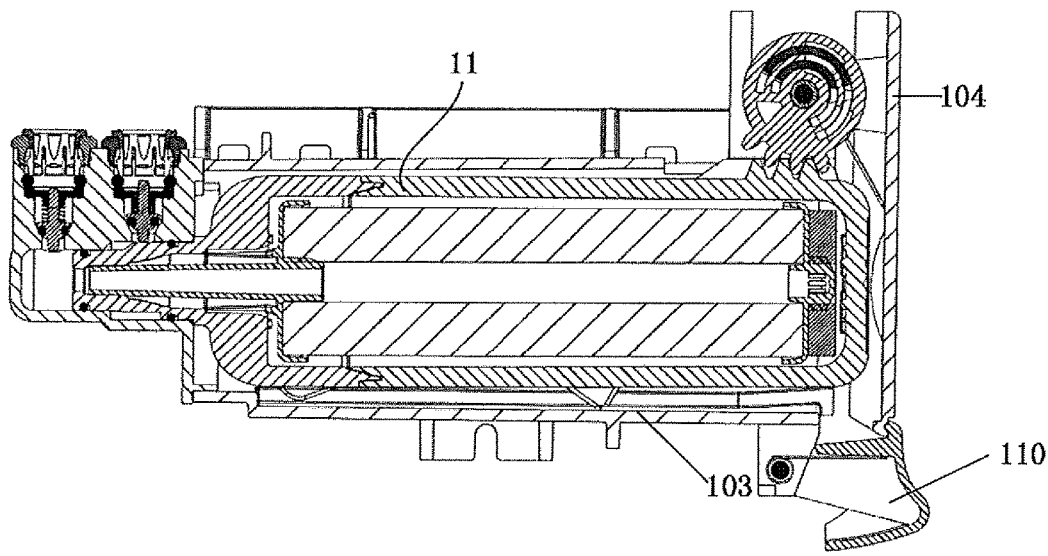
Figure 14C:
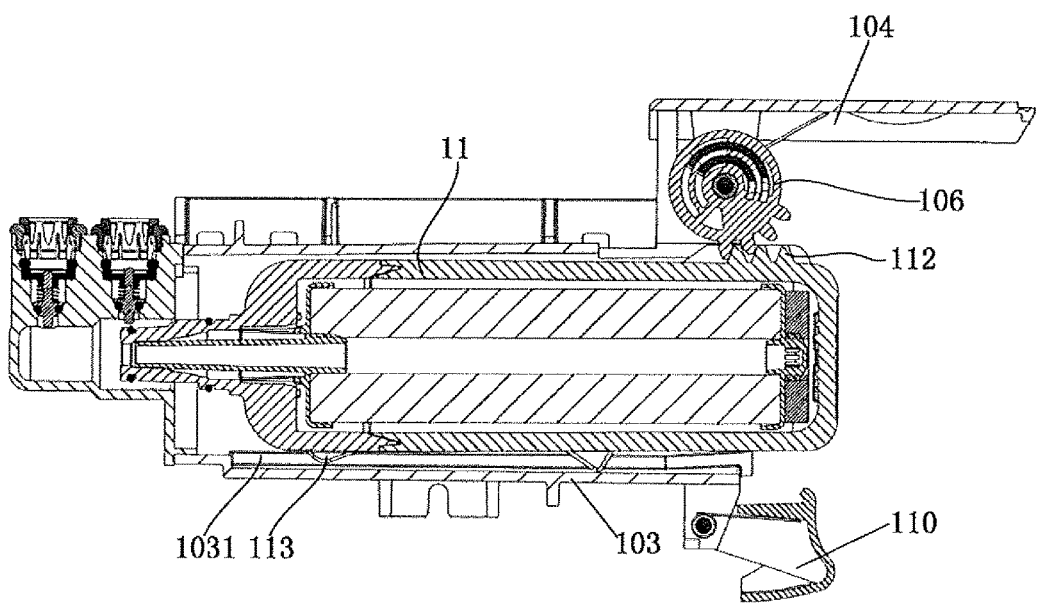
Figure 14D:
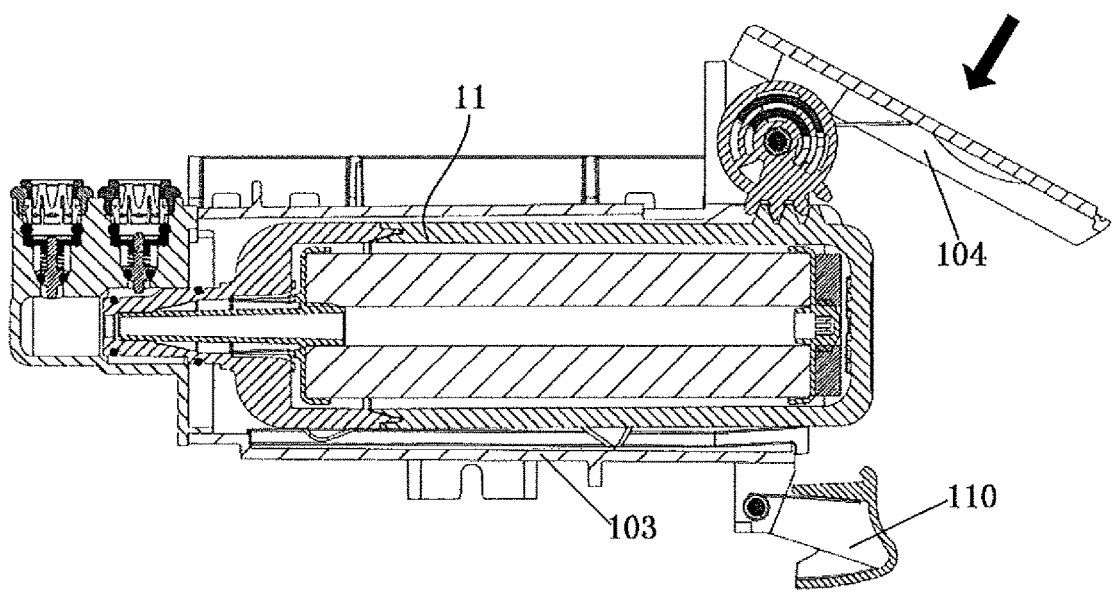

Please refer to FIGS. 14A to 14D, which are schematic views showing the process of inserting the filter core 11. FIGS. 14A and 14B are one installation way, and FIGS. 14C and 14D are the other installation way.

Please refer to FIGS. 14A and 14B, the convex rib 113 is aligned with the core-guiding groove 1031, then the filter core 11 can be directly inserted into the cabin body 103, and the gear driving assembly 106 can be engaged with the driving rack 112. In the embodiment of FIGS. 14A and 14B, the slider 109 (the numeral seen in FIG. 9) is unconnected with the gear driving assembly 106 under the force of the slider spring, so the cabin door 104 can be always in a full opened state and not be moved. When the filter core 11 is completely inserted into the cabin body 103, the cabin door 104 will be pushed inward, and the cabin door 104 is engaged with the door button 110. Now, the filter core 11 is completely locked in the cabin body 103, thereby completing the installation of the filter core 11.

Please refer to FIGS. 14C and 14D, when the convex rib 113 is aligned with the core-guiding groove 1031, the filter core 11 can be inserted into the cabin body 103 and make the driving rack 112 to be engaged with the gear driving assembly 106. Then, the cabin door 104 is pushed inward and can apply a push force unto the filter core 11 through the gear driving assembly 106, so that the filter core 11 can be completely pushed into the cabin body 103. Finally, the cabin door 104 is engaged with the door button 110, and the filter core 11 can be completely locked in the cabin body 103, thereby completing the installation of the filter core 11.

The filter device of the present invention can realize the object of quickly replacing the filter core 11 by the special design of the filter core 11, the filter cabin 10 and the gear driving assembly 106. The user can pull out the filter core 11 from the filter cabin 10 by opening the cabin door 104.

The filter device of the present invention can make the user save energy, fast and quickly replace the filter core by the special design of the filter core 11, the filter cabin 10 and the gear driving assembly 106. The filter device can be applied in the most of home appliances, thereby largely improving the use value thereof, and greatly satisfying the consumer demand for the high quality drinking water.

In conclusion, although the present invention has been disclosed by above preferred embodiments, above preferred embodiments are not used to limit the present invention. One of ordinary skills in the art also can make all sorts of improvements and amendments within the principles of the present invention. Therefore, the protection scope of the present invention should be based on the scope defined by the appended claims.

What is claimed is:

1. A filter device, which has a water inlet and a water outlet, comprising a filter cabin and a filter core;

the filter cabin comprising a cabin body for accommodating the filter core, a cabin door being rotatably connected to the cabin body, and a gear driving assembly being mounted on a connection position of the cabin body and the cabin door; the cabin body disposing a gear-mounting slot for receiving and holding the gear driving assembly; wherein the water inlet and the water outlet are disposed on one end of the filter cabin; and the filter core having an end portion, which is fluidly connected with the water inlet and the water outlet; the filter core disposing a driving rack on an outside surface thereof;

wherein the driving rack is engaged with the gear driving assembly.

2. The filter device as claimed in claim 1, wherein the gear driving assembly includes a driving gear and a sub rail wheel, both of which are axially connected together by a fastener;

the driving gear disposes a slider track groove, at least two wheel-limiting bars located in the slider track groove, and gaps defined by the two wheel-limiting bars and the slider track groove; each wheel-limiting bar disposes a gear track protrusion;

the sub rail wheel disposes two wheel track projections and a torsion spring-fastening boss on one side thereof connected with the driving gear, and further disposes a wheel-fastening pin on the other side thereof;

the two wheel track projections are inserted into the gaps for making the driving gear and the sub rail wheel to be combined together;

the gear driving assembly includes a slider and a torsion spring; wherein the slider is placed in the slider track groove for pushing both the gear track protrusion to drive the driving gear to rotate relative to the sub rail wheel; and, the torsion spring is mounted on the torsion spring-fastening boss;

each wheel track projection has an arc cross section, an arc center angle of which is between 180 degrees and 270 degrees; and each wheel track projection has a lowest position and a highest position, which are continuously connected; when the driving gear and the sub rail wheel are combined together, the lowest position of each wheel track projection is aligned with both the wheel-limiting bars of the driving gear, and the highest position of each wheel track projection is aligned with both the gear track protrusions;

the cabin door disposes a slider-fastening portion, which forms a slider-receiving groove thereon; and the slider is embedded into the slider-receiving groove; and, the cabin door further disposes a slider spring in the slider-receiving groove, and the slider spring is located between the slider and a bottom of the slider-receiving groove.

3. The filter device as claimed in claim 2, wherein the cabin body disposes a core-guiding groove on the bottom of the cabin body, and correspondingly the filter core disposes a convex rib on the outside surface thereof for being engaged with the core-guiding groove.

4. The filter device as claimed in claim 3, wherein the filter core further disposes a protrusion block on the end portion thereof.

5. The filter device as claimed in claim 1, wherein the cabin body further disposes a door-limiting post on the connection position of the cabin door and the cabin body, and the door-limiting post is used to limit an opening angle of the cabin door; and, the cabin body further disposes a door spring to be mounted on the connection position of the cabin door and the cabin body.

6. The filter device as claimed in claim 1, wherein the filter device further comprises a door button, which is connected with the cabin body through a button-fastening shaft; the button-fastening shaft disposes a spring thereon; and the cabin door is locked by the cabin button.

7. The filter device as claimed in claim 6, wherein the cabin door disposes a locking portion for being engaged with the cabin button.

* * * * *